Feb. 26, 1924.
C. W. FRANCIS
1,484,635
LUBRICATING SYSTEM FOR GEARING
Filed Feb. 18, 1922
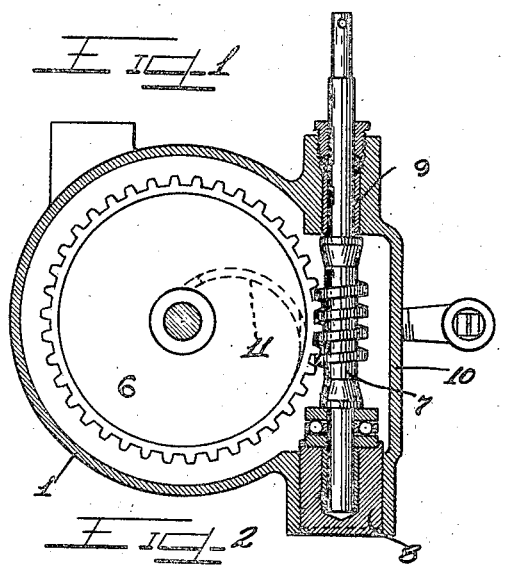
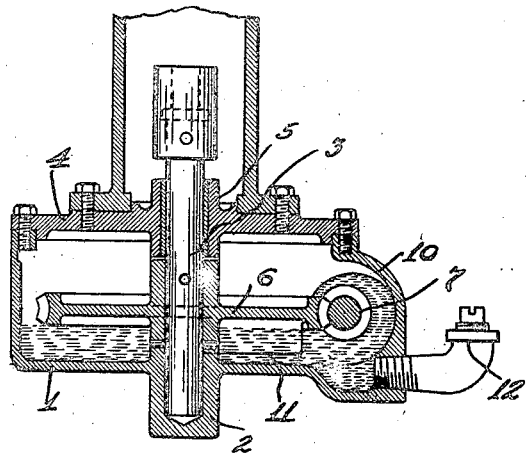

Patented Feb. 26, 1924.

1,484,635

UNITED STATES PATENT OFFICE.

CHARLES W. FRANCIS, OF PATERSON, NEW JERSEY, ASSIGNOR, BY MESNE ASSIGNMENTS, TO EDEN WASHER CORPORATION, A CORPORATION OF DELAWARE.

LUBRICATING SYSTEM FOR GEARING.

Application filed February 13, 1922. Serial No. 537,473.

*To all whom it may concern:*

Be it known that I, CHARLES W. FRANCIS, a citizen of the United States, and a resident of the city of Paterson, in the county of Passaic and State of New Jersey, have invented certain new and useful Improvements in a Lubricating System for Gearing; and I do hereby declare that the following is a full, clear, and exact description of the same, reference being had to the accompanying drawings, and to the numerals of reference marked thereon, which form a part of this specification.

This invention relates to a lubricating system for gearing and it is an object of this invention to provide a system in which the oil is caused to flow over the intermeshing teeth in a simple and efficient manner.

It is a further object of this invention to provide one of the rotating gears with oil circulating means.

With these and other objects in view, which will become more apparent in the following description and disclosures in the drawing, this invention comprises the novel mechanism and combinations hereinafter described and more particularly pointed out and defined in the appended claims.

In the accompanying drawings, which illustrate a preferred embodiment of this invention and in which similar reference numerals refer to similar features in the different views:

Fig. 1 is a horizontal sectional view with parts in elevation illustrating the gearing that it is adapted to lubricate.

Figure 2 is a vertical section through a transmission housing illustrating the operation of my improved lubricating system applied to the transmission.

As shown in the drawings:

In referring to the drawings, it will be observed that there is illustrated an oil chamber or container 1 having a closed bearing boss 2 centrally of the bottom in which a shaft 3 is journalled. The chamber or container is closed by a cover 4 secured in any appropriate manner to the top of the container as by screws or the like. The central part of the cover is provided with a bearing 5 through which the shaft 3 extends. A horizontal worm wheel 6 is secured upon the shaft 3 within said chamber, and is adapted to be driven by a worm 7 journalled in bearings 8 and 9 formed in the walls of the lubricant container 1. Between the bearings 8 and 9, the wall 10 of the container is constructed of arcuate form to provide an upwardly and inwardly directed slope or curve over the worm 7 to form a curved guideway for guiding the lubricant to the intermeshing teeth of the gear and worm.

In order to cause the lubricating oil to circulate over the intermeshing gear teeth, the lower side of the gear 6 is provided with a curved deflector 11 which operates in the lubricating oil in the container which is preferably filled to a suitable height for this purpose through the oil duct 12. As the gear 6 is caused to revolve in an anti-clockwise direction, the curved deflector 11 will deflect the lubricating oil outwardly against the walls of the container. As the lubricating oil is thuswise deflected outwardly and dashed against the walls of the container, that which strikes the upwardly and inwardly curved portion 10 which surrounds the worm 7 will be cascaded or swerved over the top of the worm and down upon the intermeshing gear teeth, as is obvious. The arcuate wall 10 may accordingly be termed a deflector that deflects the lubricating oil over the intermeshing teeth of the gears.

I am aware that numerous details of construction may be varied through a wide range without departing from the principles of this invention, and I therefore do not purpose limiting the patent granted otherwise than necessitated by the prior art.

I claim as my invention:

1. In a device of the class described, a lubricant container, a horizontal gear supported for rotation in said chamber, and having a curved lubricant deflector upon its lower surface and a worm meshing with said gear, said container having a curved wall surrounding said worm for deflecting the lubricant upon the intermeshing teeth of said gear and worm, during the operation of said gear.

2. In a transmission lubricating system, a lubricant container, a pair of intermeshing gears supported in said container, one of said gears having a lubricant deflector, and said container having a curved lubricant deflector adjacent the intermeshing teeth of said gears whereby the lubricant will be deflected upon the intermeshing teeth of said gears.

3. In a lubricating system for intermeshing gears, a stationary curved deflector for guiding the lubricant over the intermeshing teeth, and means for deflecting the lubricant against said stationary deflector.

In testimony whereof I have hereunto subscribed my name in the presence of two subscribing witnesses.

CHARLES W. FRANCIS.

Witnesses:
R. ALBERT HEATHWOOD,
BETTY H. HAMILTON.